United States Patent [19]
Hope

[11] Patent Number: 5,653,108
[45] Date of Patent: Aug. 5, 1997

[54] GAS TURBINE-TWO-STROKE PISTON COMPOUND ENGINE

[75] Inventor: Jack I. Hope, Hillsboro, Ohio

[73] Assignee: Haeco Partners, Ltd., Hillsboro, Ohio

[21] Appl. No.: 328,121

[22] Filed: Oct. 24, 1994

[51] Int. Cl.$^6$ .................................................. F02B 37/00
[52] U.S. Cl. ........................................ 60/606; 123/90.26
[58] Field of Search .................. 60/606, 624; 123/90.26, 123/65 UC

[56] References Cited

U.S. PATENT DOCUMENTS

| | | | |
|---|---|---|---|
| 1,869,919 | 8/1932 | Seabrook | 123/90.26 |
| 2,216,494 | 10/1940 | Kurtz et al. | 60/606 |
| 3,498,053 | 3/1970 | Johnston | |
| 4,543,916 | 10/1985 | Giorno | |

FOREIGN PATENT DOCUMENTS

| | | | |
|---|---|---|---|
| 709825 | 1/1980 | U.S.S.R. | 60/606 |
| 992769 | 1/1983 | U.S.S.R. | 60/606 |

OTHER PUBLICATIONS

"A New Concept for Reduced Fuel Consumption in Internal Combustion Engines", by Jack I. Hope and Robert D. Johnston, Engine Systems, Inc., Reprinted Aug. 1971 from 1971 Intersociety Energy Conversion Engineering Conference Proceedings, p. 38 by Society of Automotive Engineers, Inc., New York, NY SAE 719051.

"Adiabatic Engine Program" presented by Dr. Walter Bryzik, Automotive Technology Development Contractors' Coordination Mtg., Nov. 11–14, 1980, Dearborn, Michigan.

"Gas Turbine/Diesel Compound Engine (Giesel) Design–Fabrication–Test", Contract DAAE07–83–C–R093, Dec. 1988, by Jack I. Hope and Robert Graham, pub. by U.S. Army Tank–Automotive Command, Warren, MI.

Primary Examiner—Michael Koczo
Attorney, Agent, or Firm—Wood, Herron & Evans, P.L.L.

[57] ABSTRACT

A compound engine including a gas turbine unit and a two-stroke uniflow scavenge piston unit having a hollow cylindrical exhaust valve mounted concentrically with an associated piston to form a portion of the combustion chamber within a peripheral wall of the exhaust valve. A double acting exhaust valve actuator is responsive to rotation of the crankshaft and is operatively coupled to the peripheral wall of the hollow cylindrical exhaust valve to produce forces derived directly from rotation of the crankshaft to open and close the exhaust valve. The actuator is a camshaft having two sets of cams which drive a cam follower in response to rotation of the crankshaft.

10 Claims, 4 Drawing Sheets

GAS TURBINE-TWO-STROKE PISTON COMPOUND ENGINE

FIELD OF THE INVENTION

The invention relates generally to compound engines, and more particularly, to a single engine comprised of a combination of gas turbine and piston units which are drivingly connected to an output drive shaft.

BACKGROUND OF THE INVENTION

An early compound engine that is comprised of a gas turbine unit and a piston unit is disclosed in the Johnston U.S. Pat. No. 3,498,053. In Johnston, the turbine unit is operated by the exhaust gases from a reciprocating two cycle, compression ignition, piston unit. The gas turbine unit of Johnston has a compressor component to supercharge the piston unit, and the turbine unit is also coupled to the output shaft of the piston unit. The Johnston piston unit has pairs of opposed cylinders with a scotch yoke connecting the pistons to a crankshaft.

A subsequent version of the compound engine is described in a publication entitled "A New Concept For Reduced Fuel Consumption In Internal Combustion Engines" presented at the 1971 Intersociety Energy Conversion Engineering Conference Proceedings. P38, by the Society of Automotive Engineers. This publication discloses a low pressure turbine mechanically coupled to the output shah of the piston unit and fluidly driven by the output of a high pressure turbine unit. The piston unit is a compression ignition two-stroke unit in which excess scavenge air flow in the valve-open portion of the stroke is used to internally cool the piston and cylinder. The exhaust valve is an annular valve located at the top of the cylinder and forms a portion of the wall of the combustion chamber. A bypass burner, that is, a thermal reactor, is placed in a parallel flow path between the high pressure compressor and high pressure turbine. To start the engine, a small starter motor spins the high pressure turbine, and combustion is initiated in the bypass burner. The bypass burner then becomes the combustion system to provide a driving gas for the high pressure turbine. The high pressure turbine first, mechanically drives the compressor to provide high pressure air to the piston unit, and second, provides a driving gas to the low pressure turbine which, in turn, provides cranking power to start the piston unit.

While the feasibility of many of the principles of the above engine configuration has been proven, there are several areas where components that are suitable for either only turbine engines, or only piston engines, are less suitable for compound engines and thus require further investigation and development. For example, the exhaust valves in typical compression ignition engines are generally of the poppet type and are actuated by an engine driven cam shaft which operates the valves through a rocker arm arrangement. The valves are held in a closed position by means of compression springs against which the rocker arm and cam operate to open the valves. As engine speed increases, the rate of occurrence of combustion cycles increases; and the speed with which the exhaust valves are opened and closed also increases. The speed with which the exhaust valves open is controlled by the engine driven cam. However, the speed with which the exhaust valves close can only be increased by increasing, or making larger, the spring constant of the valve return springs. While the stronger valve return springs facilitate operation of the engine at high speeds, these very strong valve compression springs have the disadvantage of requiring a very high torque to rotate the engine for starting, thereby making the engine more difficult to start, or otherwise turn over with an auxiliary starting motor or the low pressure turbine.

Therefore, to reduce the starting torque of the engine requires that the valve return springs be weaker; however, those weaker springs compromise the maximum speed of the engine because, as the engine speed increases, a speed will be reached at which the valve return springs will not be able to bring the valve to its fully closed position prior to combustion. Consequently, the exhaust valves will float in a constantly open position which has the disadvantage of governing or limiting the speed of the engine.

Conventional compression ignition engines address the high starting torque problem in several ways. First, a starter motor powered by a battery is used to start the engines, and an increased starting torque is accommodated by simply increasing the size of the starting motor and battery. In addition, an igniter can be used to provide ignition while the cold engine is being started. Often a bleeder valve is operable when the engine is being started to bleed pressure from the cylinder during the compression stroke. While effective, all of the above solutions have the disadvantage of adding complexity, weight and cost to the engine. More importantly, such solutions interfere, or are incompatible with, a turbine and piston unit working together.

Compound engines, and in particular the compound engines described above, have a piston unit with specially configured exhaust valves and combustion chambers. Further, the combination of the gas turbine unit with the piston unit presents difficult gas flow and energy transfer requirements. The valve actuations proposed by the prior art create additional problems in the manufacture and operation of such a compound engine. Accordingly, there remains a need for a solution to the valve actuation problems associated with compound engines of the type to which the present invention relates.

SUMMARY OF THE INVENTION

An object of the present invention is to provide a mechanism for operating the exhaust valves of the piston unit of the compound engine which eliminates the above compromise between engine speed and starting torque.

A further object of the present invention is to provide a mechanism for operating the exhaust valve of the piston unit of the compound engine which allows the piston unit to operate over its full speed range.

Another object of the present invention is to provide a mechanism for operating the exhaust valve of the piston unit of the compound engine which presents sufficiently low starting torque that a low pressure turbine of the gas turbine unit, which is connected to the piston unit crankshaft, can be used to start the piston unit of the engine.

To overcome the above disadvantages, the present invention provides a compound engine comprised of a gas turbine unit and a two-stroke uniflow scavenge piston unit in which the piston unit may be operated over a wide speed range but may be started, or otherwise turned with the gas turbine unit.

According to the principles of the present invention, there is provided a compound engine including a gas turbine unit and a two-stroke uniflow scavenge piston unit in combination with a double acting cam drive for operating the piston unit exhaust valves. In accordance with the described embodiments of the invention, a cam shaft is coupled to the crankshaft of the piston unit and contains two cam surfaces for each exhaust valve. A first cam surface is mechanically coupled to the exhaust valve and is operative to move the exhaust valve to an open position. A second cam surface is also mechanically coupled to the exhaust valve and is operative to return the exhaust valve to its closed position.

In another embodiment of the invention, a first cam follower is in contact with the first cam surface to move the exhaust valve in a first direction, and a second cam follower is in contact with the second cam surface to move the valve in a second direction. In a further embodiment, the second cam surface includes a pair of cam surfaces on each side of the first cam surface; and the second cam follower includes a pair of second cam followers in contact with the pair of cam surfaces. In a further embodiment, the cam followers are mechanically coupled to the exhaust valve by a connecting link. In a still further embodiment, the exhaust valve is a cylindrical hollow body and the connecting link is a pair of connecting links connected to opposite sides of the exhaust valve. In a further embodiment, the invention provides a method of starting the compound engine with the double acting cam drive for the exhaust valve. And, in another embodiment of the invention, the double acting cam drive for the exhaust valve is applied to a two-stroke uniflow scavenge engine.

The above double acting cam arrangement provides positive and direct exhaust valve operation that is synchronized with the operating speed of the piston unit. With the double acting cam, the exhaust valve will always be brought to its fully closed position and will not float at higher operating speeds. Therefore, the present invention has the advantage of not limiting engine speed. Further, by eliminating the valve return springs, the present invention has the further advantage of requiring less torque to start the piston unit; and the piston unit may be easily started with the gas turbine unit.

These and other objects and advantages of the present invention will become more readily apparent during the following detailed description, together with the drawings herein.

DETAILED DESCRIPTION OF THE INVENTION

Figure 1:
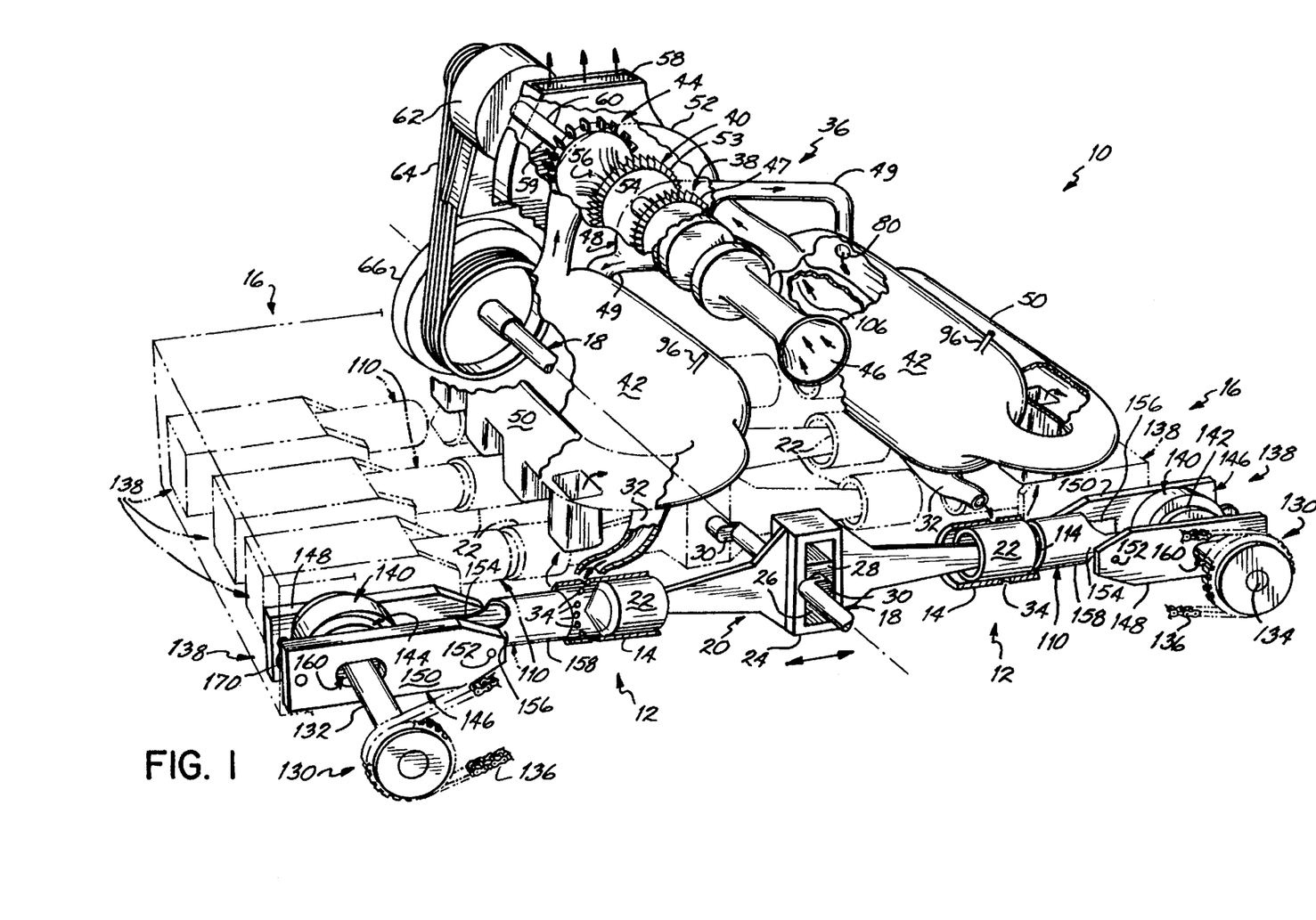
FIG. 1 is a diagrammatic perspective view of a compound engine according to one preferred embodiment of the present invention.
Figure 2:
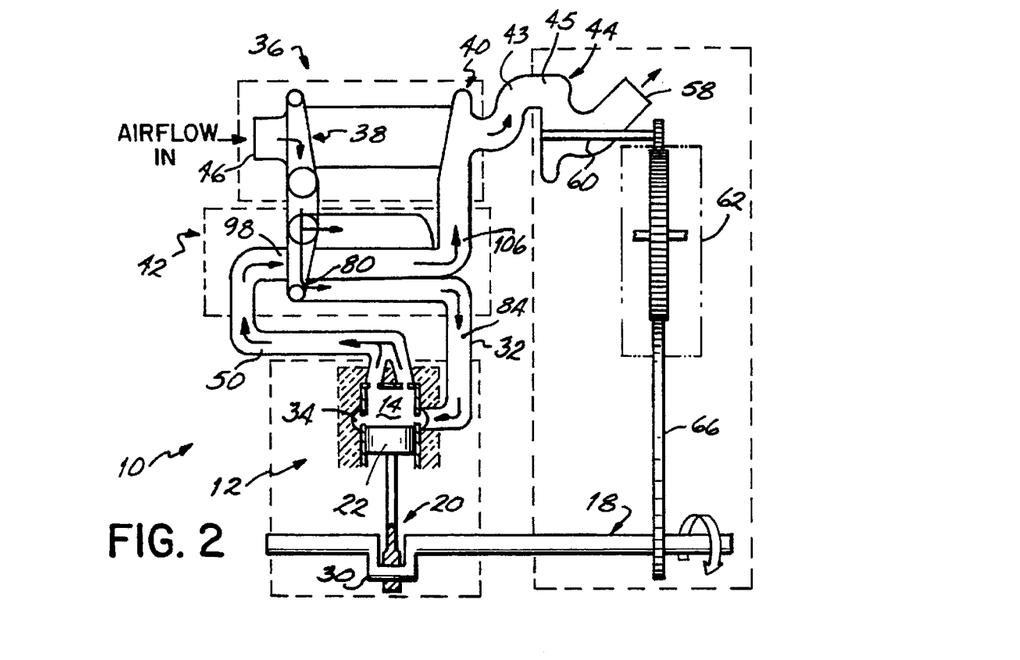
FIG. 2 is simplified schematic diagram of the engine of FIG. 1.
Figures 3, 6:
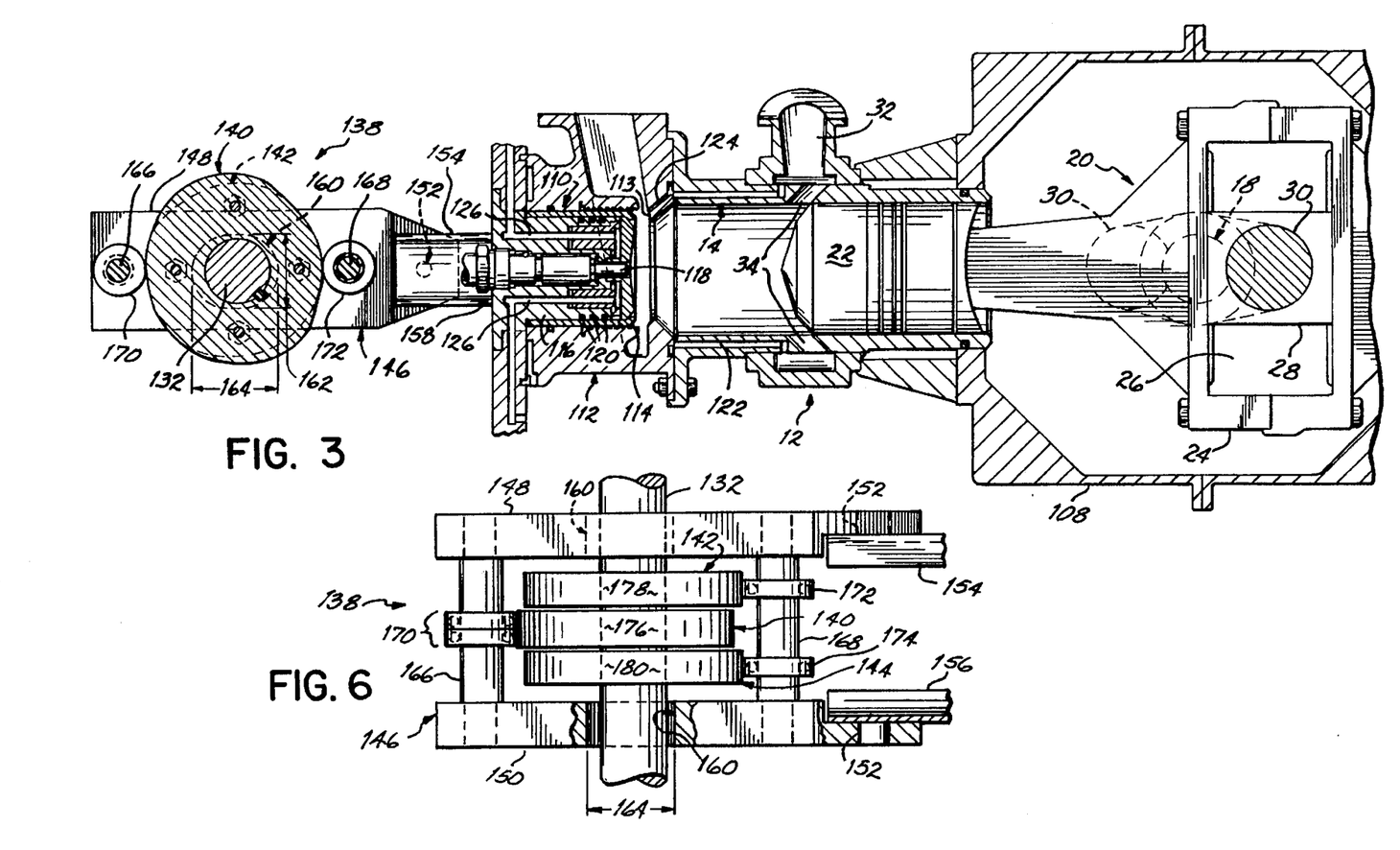
FIG. 3 is a partial cross-sectional view illustrating a piston and cylinder unit connected to the crankshaft and the double acting valve mechanism of the engine of FIG. 1.
FIG. 6 is a top view of the double acting cam unit of the engine of FIG. 1.

Referring to FIGS. 1, 2 and 3, the compound engine 10 is comprised of a piston unit 12 and a gas turbine unit 36. The piston unit 12 is preferably a compression ignition, two-stroke, uniflow scavenge unit which includes opposed pairs of cylinders 14, preferably eight cylinders. The opposed pairs of cylinders 14 are arranged in two banks 16, one cylinder 14 of one bank 16 is directly opposite one cylinder 14 of the other bank 16. Each pair of the cylinders 14 is drivably connected to the crankshaft 18 by means of a scotch yoke 20. Each cylinder 14 contains a piston 22 rigidly connected to one end of the scotch yoke 20. The scotch yoke 20 has a crosshead 24 with a rectangular slot 26 that has a slider block 28 slidably mounted therein which is rotatably coupled to an eccentric 30 of the crankshaft 18. The cylinders 14 are generally identical, and each pair of cylinders 14 with interconnecting scotch yoke 20 are generally identical. Similarly, the bank 16 of cylinders 14 generally identical, being mirror images of each other. The piston unit 12 of the compound engine 10 is a two-stroke compression ignition diesel unit to each cylinder 14 of which combustion or cycle air is fed through an intake manifold 32 and air intake ports 34 when its respective piston 22 is in the bottom-most portion of its stroke.

The cycle air is supplied by a high pressure gas turbine unit 36 comprised of a steady flow high pressure compressor 38, a high pressure turbine 40, a pair of combustors 42 and an axial flow low pressure turbine 44. In the preferred embodiment, the high pressure compressor 38 receives cycle air through an inlet 46; and the air passes through vanes of a compressor rotor 47 and through a discharge scroll 48 that divides the compressed air into two discharge paths 49,49, each of which routes the air to one of the two combustors 42. The turbine unit 36 is configured such that exhaust gases from the cylinders 14 of each bank 16 of the piston unit 12 pass through one of a pair of exhaust manifolds 50, respectively associated with each bank 16, and through a respective one of the two bypass combustors 42 of the gas turbine unit 36. The combustors 42 are configured to drive the high pressure turbine 40 by routing the exhaust gases from the combustors 42 to the two entrances on each side of the engine of a dual inlet variable area turbine nozzle scroll 52 and through the vanes of the high pressure turbine rotor 53. The high pressure turbine 40 output shaft is connected to a bearing and shaft assembly 54 to drivably rotate the high pressure compressor 38. The high pressure turbine 40 has variable inlet vanes (not shown) which vary the inlet area of the high pressure turbine to permit the high pressure turbine 40 to run at 100% of its desired speed even at lower speeds of the piston unit 12 which produce significantly less exhaust gases. The outlet of the high pressure turbine 40 is fluidly connected to a conically shaped diffuser 56 which is connected to the inlet of the axial flow low pressure turbine 44. Variable vanes (not shown) may be utilized on the input of the low pressure turbine 44 to vary the pressure drop and, hence, the power produced by the low pressure turbine. Output gases from the low pressure turbine 44 are vented to atmosphere through the outlet 58.

The low pressure turbine 44 has a unitary rotor 59 and output shaft 60 connected through a speed reduction unit 62 the output of which is mechanically coupled to the crankshaft 18. The speed reduction unit 62 mounts directly on the low pressure turbine unit 44 and is lubricated by a common system. The speed reduction unit 62 consists of a ring gear, three planet gears and a sun gear to provide a very low friction, 10:1 speed reduction on the same shaft centerline as the low pressure turbine 44. A 2:1 speed reduction is accomplished in the pulley and V-belt arrangement 64 connecting the output of the speed reduction unit 62 with the crankshaft 18. A flywheel 66 weighing approximately 120 pounds is also mounted on the crankshaft 18 which provides rotary shaft output power from the compound engine 10.

The scotch yoke 20 is rigidly connected to the pistons 22 and the centrally located rectangular slot 26 extends longitudinally in a direction perpendicular to the stroke of the opposed pistons 22. That arrangement has several advantages. First, the Scotch yoke 20 provides positive guidance for the pistons 22 as they reciprocate in the cylinders 14, thereby minimizing the lateral forces between the pistons 22 and the cylinders 14. Therefore, friction and wear between the piston rings (not shown) and cylinders 14 is minimal. Second, for uncooled operation, the top of the piston and cylinder can approach 1700° F. With the rigid scotch yoke 20, the pistons 22 are guided within the cylinder 14 by clearance control on the cool and lubricated base of the piston. With the scotch yoke 20, piston skirts can be very short and provide guidance for the piston 22. A clearance between the piston and cylinder above the skirt, for example 0.005 inches, can be maintained causing no additional rubbing of the hot piston and cylinder parts. Third, the expansion forces of combustion of one piston is transferred directly as a compression force to the opposing piston. In addition, with an eight cylinder unit, two of the scotch yokes 20 are always moving at the same speed, but in opposite directions, which results in a balanced reciprocating unit. Preferably the scotch yoke is made from aluminum or composite material and has a total reciprocating mass of approximately 14 pounds or less.

Figure 4:
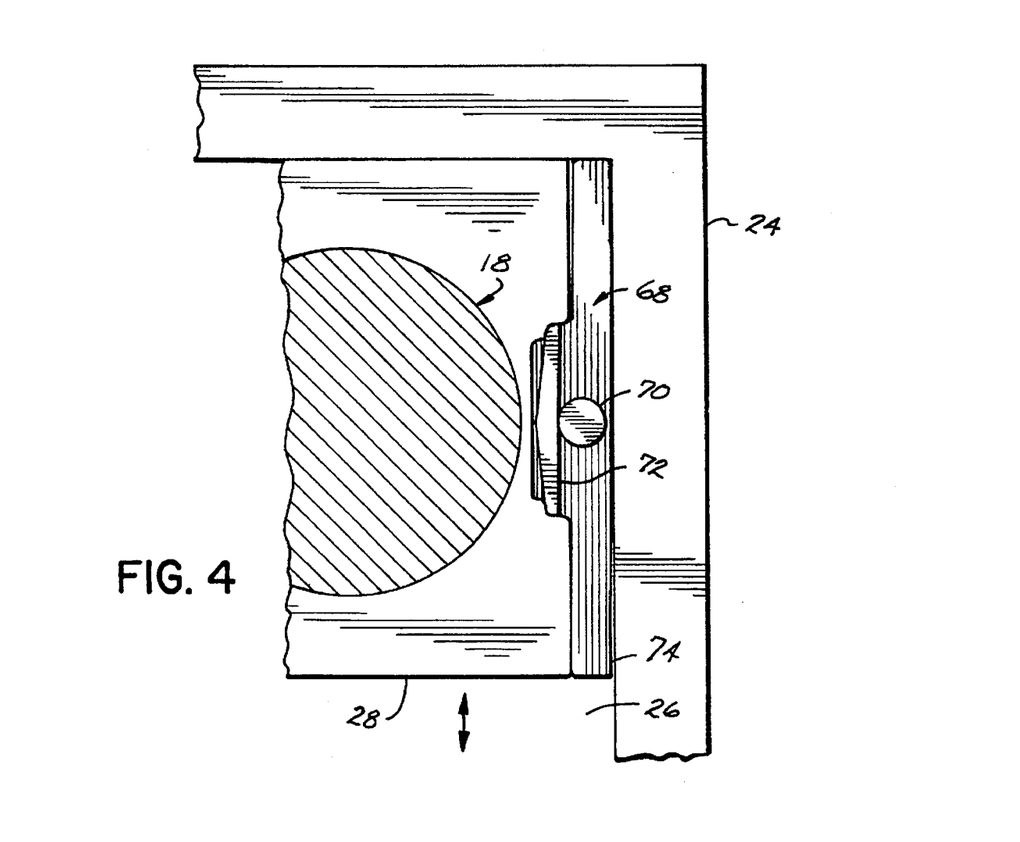
FIG. 4 is a partial cross-sectional view illustrating the tilting skate on the sliding block to provide a hydrostatic lubricating film of the engine of FIG. 1.

The maximum bearing load occurs when the slider block 28 is in the center of its run and its velocity is maximum. A hydrodynamic bearing film at this condition is approximately 4000 pounds per square inch ("psi"). At each end of the slider run where it reverses direction, the hydrodynamic film disappears and must be reestablished as the slider starts its return. To enhance the reestablishment of the hydrodynamic lubrication film, referring to FIG. 4, a pivoting pad or skate 68 is pivotally mounted on each side of the slider block 28. Each pad 68 is pivotally supported by a trunion, or pin 70, and each pad 68 bears against a metal insert or spring 72 mounted in the slider block 28. The tilting pad or skate 68 is compressed against the bearing surfaces within the slot 26 of the crosshead 24 with a force of 400 pounds by deflection of the metal insert or spring 72. During operation of the piston unit 12, as the skate 68 reverses direction, oil is ported through drilled holes (not shown) in the crankshaft 18 and slider 28 and applies a force to the trailing end of the skate 68, for example, the left end as viewed in FIG. 4, causing the skate to tilt slightly and open a wedge 74 on its forward edge, thereby rapidly reestablishing the hydrodynamic oil film. At the center of each slide, the film is determined to be approximately 0.0008 inches on the leading edge and 0.0004 inches on leaving the skate 68.

To summarize the operating cycle, referring to FIGS. 1 and, 2, with the above compound engine, high volume, low pressure air is compressed by a total ratio of approximately 200:1. The cycle air is first compressed by a ratio of approximately 5:1 by the rotating high pressure compressor 38 after which air flows through the combustors 42, the intake manifold 32, intake ports 34 and into the cylinders 14 of the piston units 12. The air is further compressed by a ratio of approximately 40:1 when the piston units 12 are operating at full power. The compression ignites fuel injected into the cylinders 14 near the top dead center portion of the piston cycle, and the energy of the combusting and expanding gases is extracted to the maximum extent possible at nearly one hundred percent (100%) efficiency by the piston units 12 through a crankshaft rotation of approximately 95° past top-dead center and an additional 30° during the opening of the exhaust valve 110. When the gases have been fully expanded in the cylinders 14 and combined with the cooling and scavenge air, they are returned through the combustors 42, to drive the high pressure turbine 40 which in turn rotates the high pressure compressor 38. Energy remaining in the exhaust gases from the piston units 12 is extracted in the low pressure turbine 44 which is connected through the gear reduction unit 62 and a V-belt unit 64 to the output of the crankshaft 18.

Figure 5:
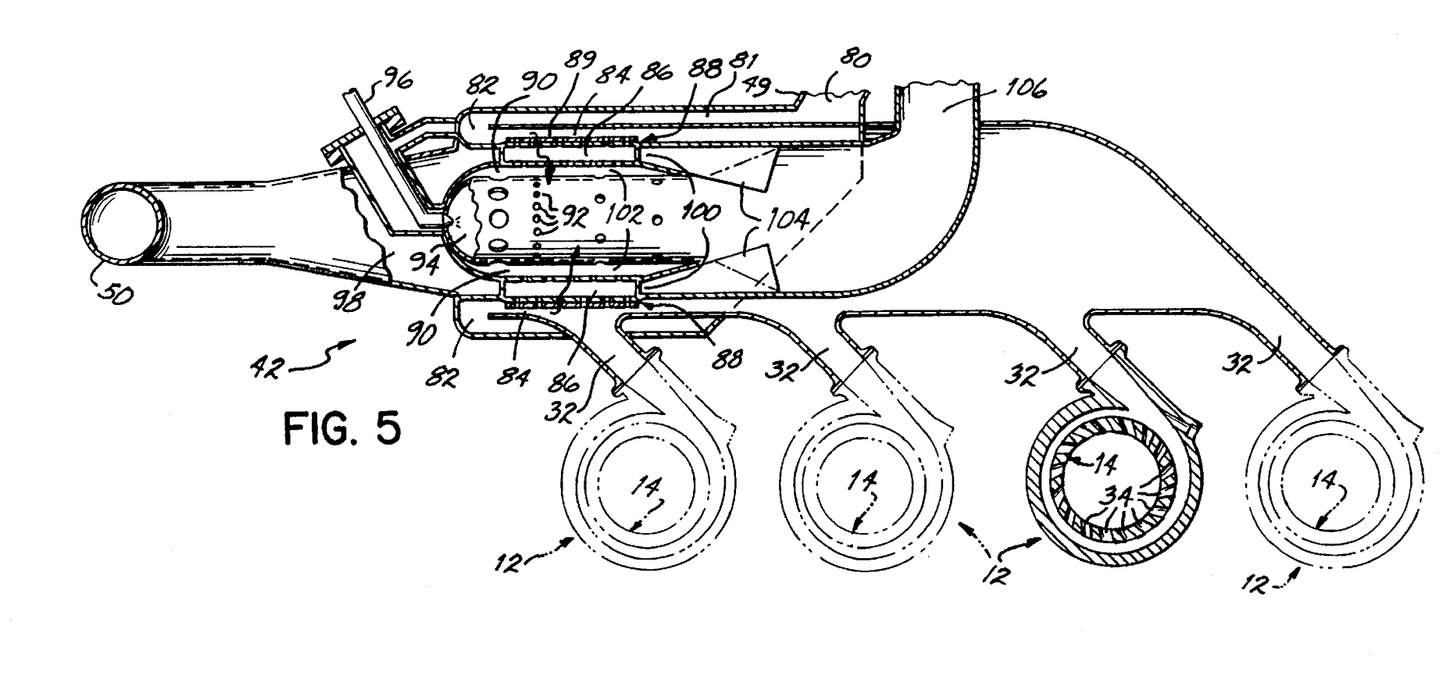
FIG. 5 is a schematic cross-sectional view of one of the combustors of the engine of FIG. 1.

The two-stroke cycle of the piston unit 12 is important because the cycle air flow characteristics of the two-stroke cycle more nearly match the continuous gas flow characteristics of the gas turbine unit 36. For instance, the intake and exhaust valves of the piston unit 12 are open for large portions, for example, one-third, of the rotation of the crankshaft 81. The cycle air flow within the compound engine 10 is unique because of the parallel flow paths provided by the combustors 42. As shown in FIG. 5, cycle air from the high pressure compressor 38 enters an outer first inlet 80 intersecting a cylindrical flow path 81 at the rear end of the combustors 42 and flows to its forward end. The cycle air then passes through annular port 82 and into a second cylindrical flow path 84. The second cylindrical flow path 84 provides a first air outlet that intersects the intake manifold 32 and radially extending struts or air passages 86 of a circumferential valve 88. The circumferential valve 88 includes a sleeve 89 which is slidably located over the struts 86 and has openings matching the openings of the strut air passages 86. During normal engine operation the sleeve 89 of the circumferential valve 88 is rotated to a position that closes but does not seal the air passages 86, and the air flows from the annular passage 81, through the intake manifold 32 and into ports 34. The sleeve 89 of the circumferential valve 88 is rotated to open the strut air passages 86 when operating bypass burners, or heaters, within the combustors 42 of the gas turbine 36. With the combustor operation, the air passages 86 intersect in an inner cylindrical air flow channel 90 which by means of cycle air ports 92 provide combustion air to a combustion chamber 94 comprising the bypass burner, or heater, within the combustors 42. Fuel is injected into the combustion chamber 94 by means of an injection line 96. Burning fuel in the thermal reactors, or combustors 42 produces exhaust gases to the second outlet passage 106 which operate as driving gases for the high pressure turbine 40. The bypass burners in the combustors 42 are ignited when starting the piston unit 12 or when it is desirable to provide a power boost to the compound engine 10. A unique feature of the compound engine 10 is the parallel air flow paths within the combustors 42. For example, cycle air can flow both to the piston unit 12 and to the combustion chambers 94 of the combustors 42. By simultaneously operating the piston unit 12 and burning fuel in the bypass burners or combustion chambers 94 of the turbine unit 36, both units 12, 36 supply driving gases to the high pressure turbine 40 which in pass through outlet 43 (FIG. 2) and turn, provide a substantial increase in the driving gases to the input 45 of the low pressure turbine 44. The output drive shaft 60 from the low pressure turbine 44 adds significant power to the crankshaft 18 from which the output power from the compound engine 10 is taken.

In another flow path, exhaust cycle gas from combustion within the cylinders 14 exits cylinders 14 via exhaust manifold 50 and enters a second inlet of the combustors at 98. The exhaust cycle gas, from the piston unit 12 flows through longitudinal passages 100 that extend between the struts or radial air passages 86. At the other end of the combustors 42, the exhaust cycle gas and the intake cycle air flowing through the cylindrical longitudinal air passage 102 pass through a daisy mixer 104 which breaks the exhaust cycle, gas and intake cycle air into smaller streams so that they more quickly mix and merge into outlet passage 106 that is connected to the inlet of the high pressure turbine 40.

Air from the high pressure compressor 38 flows through the combustors 42 to both the intakes of the open cylinders on the piston unit 12 and to the high pressure turbine 40. This operation provides compressed and heated air to the intake manifold 32 and torque to the crankshaft 18 through the low pressure turbine 44 which is fluidly coupled to the high pressure turbine 40. A unique aspect of the parallel flow path provided through the combustors 42 is that the gas turbine 36 may be started and operated independently of the piston unit 12 thereby providing the advantages of easy starting and internal cooling flow path control.

The unique air flow configuration is possible because both the gas turbine unit and the two-stroke, uniflow scavenge piston unit have a total pressure drop across the system to enable operation. Typical gas turbines have a pressure drop between the compressor and turbine of approximately five percent (5%). Recuperated turbines are higher. The pressure drop across a typical two-stroke cylinder varies with the valving arrangement, speed and power setting. For an unit with a fixed displacement scavenge compressor, the pressure ratio can vary from very low values at idle to perhaps forty percent (40%) at full power and full speed. Preferably, for surface applications of the compound engine 10, an approximately 5:1 pressure ratio high pressure compressor 38 with an approximately eighty-two percent (82%) peak efficiency is preferred. The compressor efficiency is an important parameter for a gas turbine and diesel compound engine. Since the compressor 38 provides air to the piston unit at about 400° F., a lower pressure ratio will reduce the exhaust energy recovered in the high pressure turbine 40. On the other hand, a higher pressure ratio requires the piston compression ratio to be lowered to maintain reasonable peak cylinder pressure. In addition, as the compressor ratio increases, the air temperature furnished to the piston unit 12 increases thereby reducing the cooling capabilities of that air. Further, the temperature of the cycle air at the intake manifold has a large effect on the volumetric efficiency, or the ability of the cylinder to obtain a sufficient charge of air on each stroke.

With the pressure ratio across the cylinder of the piston unit 12 at about five percent (5%), and piston air flow varying as a function of the pressure drop and speed of the piston unit 12, variable area nozzles are used on both the high pressure turbine 40 and low pressure turbine 44. Therefore, the high pressure rotor operates at one hundred percent (100%) or full speed from full power down to about twenty percent (20%) power. With the high pressure rotor operating at full speed over most of the power range, high pressure air is furnished to the intake manifold 32; and a five percent (5%) pressure drop is maintained across the cylinder 14 at most power settings. With this arrangement, the scavenge ratio will vary from about five hundred percent (500%) near idle to one hundred twenty percent (120%) at full power and full speed. The scavenge ratio or trapping efficiency is highly influenced by the speed of the piston unit 12. Scavenge efficiency is also influenced by the scavenge ratio.

Another advantage of the air flow configuration is that it provides a convenient method of starting even at very low ambient temperatures. The high pressure turbine 40 is easily started by a small starter motor (not shown) to bring it up to, for example, 5% of its desired operating speed. At the same time, the circumferential valves 88 are opened to port cycle air through the radial struts 86 (FIG. 5) and igniting the combustors 42. Once the combustors 42 are burning, they supply air to rotate the high pressure turbine 40; and the high pressure turbine 40 can be disengaged from the starter motor. The high pressure turbine 40 supplies air to rotate the low pressure turbine 44 which is coupled to the crankshaft 18 and provides a high torque which cranks the piston unit 12. The high pressure turbine 40 is also rotating the high pressure compressor 38 which by means of working the inlet air is supplying warm air to the intake manifold 32. The low pressure turbine 44 can crank the piston unit 12 for extended periods at high speeds until combustion ignition of the diesel cycle is achieved. At that point, the combustors 42 are shut off; and the circumferential valve 88 is closed.

One of the design objectives of the compound engine 10 is to minimize the engine cooling and optimize the use of heat which is created during the compression combustion process. Therefore, the internal piston and cylinder surfaces preferably tolerate the 1500° F.–1700° F. surface temperatures. The efficiency and performance of the compound engine 10 is improved by its high temperature operation. Further, the heat flow characteristics of the piston unit are improved because the relatively cool compressor discharge air enters the bottom of the cylinders 14 and the exhaust cycle gas leaves the cylinders at their top end (horizontally displaced from the inlet). This arrangement makes it easier to maintain a relatively cool area in the piston unit crankcase 108 of FIG. 3 to minimize heat transfer to the lubricating oil. It also provides an even circular temperature gradient in the cylinders thereby preventing deformation and distortion. Supplemental cooling is provided by the lubrication oil in the crankcase 108. A series of oil spray nozzles (not shown) are situated within the crankcase 108 to impinge oil on all scotch yoke bearing surfaces and on the underside of each piston 22. The crankshaft 18 is drilled to provide pressure lubrication to each main bearing and the internal slider bearings.

Because of the requirement for minimal internal cooling, a low pressure drop through the cylinder 14, a very high peak cylinder pressure, and hot metal temperatures, the compound engine 10 has several unique design features. First, the opposing cylinders 14 are exactly 180° apart and on the same centerline, and the cylinders are tied together with high-strength through bolts extending between the opposed cylinder heads. This provides for easy assembly and disassembly and relieves the longitudinal stress in the cylinder walls. This arrangement further provides larger intake port areas. The long, high-strength tie rods also permit the cylinder liner and head to be stacked in sections which permits for the easy insertion of insulating or low heat transfer gaskets, such as zirconia, if desired, to minimize the transfer of heat down the cylinder liner walls.

Second, the piston unit 12 is designed as a uniflow scavenge unit wherein the cylinder 14 and piston 22 are tapered toward the top, thereby reducing the internal volume of the combustion chamber at its upper end in order to provide several advantages. With the location of the intake ports 34 at the bottom of the cylinders and the exhaust valves 110 at the top of the cylinders, the design provides an initial swirl of the cycle air at the intake ports. The swirling pattern of the intake air continues as it rises through the cylinder 14 and accelerates as it is squeezed to a smaller and smaller diameter as it moves up the conical cylinder volume. The combustion chamber takes the shape of a small cylindrical plug with reduced surface to volume area ratio for a given clearance volume. These factors along with the high temperatures of the combustion chamber surfaces provide for a high heat release configuration. Further, the rate of heat release from the surfaces within the cylinder are greatest at those areas where the temperature is highest. In addition, the reduced volume at the upper end of the cylinder facilitates the compression ignition process. Advantageously, ignition delay is eliminated with operating surface temperatures over 1000° F.

The reduced diameter combustion chamber also facilitates the use of a hollow, cylindrical exhaust valve 110 mounted within the cylinder head 112 concentrically with the piston 22 (FIG. 3). With such a valve, the entire 360° circumference at the top of the cylinder is opened to provide an aerodynamically-shaped exhaust scroll providing a very low pressure drop across the cylinder. When the valve is closed, the exhaust valve 110 bears against and seats on an annular surface 113 within the cylinder head 112; and the combustion chamber is located inside the cylinder and the exhaust valve. The exhaust valve 110 also has an inside lip 114 on one end of its cylindrical annular body 158 which is oriented at an angle of approximately 30° F. with respect to the horizontal and is used to provide a positive seating force during combustion when there is maximum pressure within the cylinder. An advantage of such a valve design is that scavenge efficiency is minimally from seventy percent to ninety percent. Further, depending on a combination of gas turbine and piston unit speed, the scavenge efficiency will reach one hundred percent (100%).

The exhaust valve 110 is mounted around and moves longitudinally with respect to a center body 116 which holds a fuel injector 118. Fuel injection is accomplished by utilizing an eight-plunger fuel pump (not shown) with cam plunger springs and governor to drive the eight fuel injectors. All eight high pressure fuel injection lines are identical in length so that all injector needle lift pressures are approximately the same, for example, 3200 psi. Sealing rings 120 are contained on both the center body and the cylinder head 112 to seal combustion gases from leaking past the exhaust valve 110 that is reciprocating therebetween. By mechanisms not shown, the center body 116 may be selectively moved a small displacement toward and away from the piston 22, thereby changing the size of the combustion chamber within the piston unit 12 and hence the compression ratio. Changing the compression ratio is beneficial when operating the piston unit 12 at very low speeds, for example, at idle.

With the designed pressure drop across the two-stroke piston unit, all cooling is provided by the cycle air and except for the scotch yoke lubrication cooling, no external cooling mechanisms are used. Small amounts of cycle air are diverted through passages 122 of the cylinder 14, passages 124 of cylinder head 112 and passages 126 of center body 116 to cool critical areas the piston unit 12. The cooling passages 124 are an annular arrangement of impingement cooling holes to direct air onto the tip of the exhaust valve 110 and the exhaust valve seat. The cycle air cooling is effective to maintain component temperatures at desired levels. Temperature levels are maintained high, for example, 1200° F.–1500° F. which reduces the amount of bypass cooling air and allows it to pick up sufficient energy such that upon reentering the cycle in the exhaust manifold much of the cooling energy can be recovered in the downstream turbine 44. Using that diverted cooling cycle air, the tip of the exhaust valve 110 is cooled by impingement air from the cylinder cooling holes 124. These holes are arranged so that they flow and impinge air on the valve seat even while closed.

Referring to FIG. 1, in order to permit a wide speed range for the piston unit 12, a double acting drive mechanism 130 is provided to operate the exhaust valves 110. A pair of cam shafts 132, 134 are coupled by a chain drive 136 to the crankshaft 18. Identical double acting cam units 138 are mounted on the cam shafts 132, 134 at locations adjacent the exhaust valves 110. Each of the double acting cam units 138 includes a first cam 140 with a first cam surface which is operative to open a respective exhaust valve 110 and a second cam, or preferably a pair of cams 142, 144 with respective identical second and third cam surfaces which are operative to close the respective exhaust valve 110. The double acting cam units 138 are operative with identical cam follower units 146.

Referring to FIGS. 1 and 6, each of the identical cam follower units 146 includes connecting links 148, 150 which are pivotally connected at one end to pins 152. The pins 152 are rigidly mounted in and extend outwardly from an opposed pair of projecting lugs or ears 154, 156 that rigidly extend from opposite sides of the annular body 158 of the exhaust valves 110. Each of the identical connecting links 148, 150 also include generally a oblong-shaped through hole 160 which has a minor diameter 162 (FIG. 1) sized to mate with and receive the diameter of the cam shafts 132, 134 passing through the hole 160. The hole 160 has a major diameter 164 (FIG. 6) that is sized to permit the cam follower unit 146 to move through generally linear strokes or displacements corresponding to the motion of the exhaust valves 110 as they are opened and closed by the double acting cam unit 138.

Referring now to FIGS. 3 and 6, each of the cam follower units 146 further includes shafts 166, 168 on which are mounted cam followers 170, 172, 174. Operation of the piston unit 12 rotates the crankshaft 18 which in turn causes cam shaft 132 to rotate thereby rotating the exhaust valve operating cams 140, 142, 144. As the cam shaft 132 rotates the cams 140, 142, 144, respective cam surfaces 176, 178, 180 maintain continuous contact with the cam followers 170, 172, 174, respectively. However, because of the elliptical shape of the cams 140, 142, 144, the cam surface 176 of cam 140 is operative to move the cam follower unit 146 to the left away from piston 22 and crankshaft 18 as viewed in FIG. 3, thereby opening the exhaust valves 110. During a further rotation of the cam shaft 132, the relationship between the cam surfaces 178, 180 of the eccentric cams 142, 144, respectively are effective to move the cam follower unit 146 to the right toward piston 22 and crankshaft 18 as viewed in FIG. 3, thereby closing the exhaust valves 110. The positive double action of the operation of the exhaust valves 110 permits the piston unit 12 to operate over a wide speed range without any change in the magnitude of the forces required to operate the exhaust valves 110 as is the case with the use of compression springs to close the exhaust valves. Consequently, the torque required to actuate the exhaust valves is minimal which facilitates starting of the compression ignition piston unit 12 with the gas turbine unit 36.

While the invention has been set forth by a description of the preferred embodiment in considerable detail, it is not intended to restrict or in any way limit the claims to such detail. Additional advantages and modifications will readily appear to those who are skilled in the art. For example, the operation of cam 140 and cams 142, 144 to respectively open and close the exhaust valves 110 may be reversed so that the cam 140 and cams 142, 144 respectively close and open the exhaust valves 110. In addition, the pair of operatively duplicate cams 142, 144 may be replaced by a single cam. Further, the pivotal connection of the connecting links 148, 150 onto the trunion pins 152 may alternatively be a rigid connection. Even though eight cylinders are shown in FIG., 1, any number of pairs of opposed cylinders may be used. While the double acting cam unit is described as being preferable with the compound engine disclosed herein, the double acting cam unit can be used to operate the exhaust valve of any two-stroke uniflow scavenge engine unit.

The invention therefore in its broadest aspects is not limited to the specific details shown and described. Accordingly, departures may be made from such details without departing from the spirit and scope of the invention.

What is claimed is:

1. A compound engine comprising:
   a gas turbine unit including
      a compressor receiving ambient air for providing cycle air,
      a thermal reactor receiving the cycle air and providing cycle gas to first and second outlets of the thermal reactor,
      a first turbine connected to and driving the compressor, the first turbine receiving cycle gas from the second outlet of the thermal reactor, and
      a second turbine having an input fluidly coupled to an output of the first turbine; and
   a two-stroke uniflow scavenge piston unit having
      an intake in fluid communication with the first outlet of the thermal reactor,
      a crankshaft mechanically coupled to the second turbine,
      a camshaft operatively coupled to the crankshaft and rotating in synchronization with the crankshaft;
      a plurality of piston and cylinder units, each of the piston and cylinder units having
         a piston mounted for sliding motion within a respective cylinder and operatively connected to the crankshaft,
         a hollow cylindrical exhaust valve mounted concentrically with the piston at one end of the respective cylinder, the exhaust valve being mounted for sliding motion with respect to an inner surface of a respective piston and cylinder unit, and the exhaust valve being in fluid communication with the second outlet of the thermal reactor,
      a double acting exhaust valve actuator responsive to rotation of the camshaft and operatively coupled to an annular body of the hollow cylindrical exhaust valve, the exhaust valve actuator
         producing a first force derived directly from rotation of the camshaft to open the exhaust valve, the first force being applied to the annular body of the exhaust valve in a direction substantially away from the crankshaft, and
         producing a second force derived directly from rotation of the camshaft to close the exhaust valve, the second force being applied to the annular body of the exhaust valve in a direction substantially toward the crankshaft.

2. The compound engine of claim 1 wherein the double acting exhaust valve actuator comprises:
   a first cam surface on the camshaft associated with opening the exhaust valve;
   a second cam surface on the camshaft associated with closing the exhaust valve; and
   a follower unit simultaneously contacting the annular body of the exhaust valve and of the first cam surface and the second cam surface, the cam follower unit translating longitudinally to provide the opening and the closing of the exhaust valve in response to rotation of the camshaft.

3. The compound engine of claim 2 wherein the second cam surface comprises a pair of cam surfaces, each of the pair of cam surfaces being located on one side of one of the first cam surface.

4. The compound engine of claim 3 wherein the cam follower unit further comprises a pair of connecting links, each of the connecting links being connected to a member on one side of the peripheral wall of the exhaust valve and having an opening at an opposite end for receiving the cam shaft.

5. The compound engine of claim 4 wherein the cam follower unit further comprises:
   a first cam follower mounted proximate the one end of the pair of connecting links and contacting the first cam surface; and
   a second cam follower mounted proximate the opposite end of the pair of connecting links and contacting the second cam surface.

6. The compound engine of claim 5 wherein the cam follower unit further comprises:
   a first shaft extending between and connected to the one end of the pair of connecting links; and
   a second shaft extending between and connected to the other end of the pair of connecting links.

7. The compound engine of claim 6 wherein the first cam surface is mounted on the first shaft and the second cam surface is mounted on the second shaft.

8. The compound engine of claim 1 wherein the compressor and the first turbine are a high pressure compressor and a high pressure turbine, respectively, and the second turbine is a low pressure turbine.

9. A compound engine comprising:
   a gas turbine unit including
      a high pressure compressor having an input receiving ambient air and having a compressor output providing cycle air at a pressure substantially greater than atmospheric pressure,
      a thermal reactor having
         a first input fluid passage connected to the compressor output for conducting the cycle air through the thermal reactor,
         a first outlet in fluid communication with the first input fluid passage for exiting a first portion of the cycle air from the thermal reactor,
         a second outlet,
         a heater selectively activated during operation of the compound engine and in fluid communication with a second portion of the cycle air to provide heated working gas to the second outlet,
         a second inlet fluid passage connected directly with the second outlet,
      a high pressure turbine connected to and driving the high pressure compressor, the high pressure turbine having an inlet fluidly coupled to the second outlet of the thermal reactor, and
      a low pressure turbine having an input fluidly coupled to an outlet of The high pressure turbine, the low pressure turbine further having an output shaft; and
   a two-stroke diesel piston unit having
      a plurality of pistons,
      a plurality of Scotch yokes, each of the plurality of Scotch yokes being operatively connected to two of the plurality of pistons,
      a crankshaft rotatably connected to the plurality of Scotch yokes and mechanically coupled to the output shaft of the low pressure turbine, the crankshaft providing a mechanical output from the compound engine, a plurality of cylinders, each of the plurality of cylinders slidably receiving one of the plurality of pistons and each of the plurality of cylinders further including,     a cycle air intake opening in a wall of the cylinder at a location above a bottom dead center position of the piston, the cycle air intake opening being in fluid communication with the first outlet of the thermal reactor;

a hollow cylindrical exhaust valve mounted concentrically with a respective one of the pistons above a top dead center position of the respective piston, the exhaust valve providing an exhaust gas outlet for the cylinder and being in fluid communication with the second inlet fluid passage of the thermal reactor, a camshaft connected to the crankshaft and rotating in synchronization with the crankshaft, the camshaft having     a first cam having a first cam surface providing a first camming action in a direction away from the crankshaft to open the exhaust valve, and     a second cam having a second cam surface providing a second camming action in a direction toward the crankshaft to close the exhaust valve, a cam follower unit operatively connected to an annular body of the exhaust valve and contacting the first and second cam surfaces, the cam follower unit translating longitudinally to open the exhaust valve in response to a translation away from the crankshaft and to close the exhaust valve in response to a translation toward the crankshaft in response the first and the second camming actions, respectively.

10. A method of starting a compound engine having a gas turbine unit including a compressor receiving ambient air for providing cycle air,     a thermal reactor receiving the cycle air through a first inlet and providing a first portion of the cycle air to a first outlet of the thermal reactor, the thermal reactor including a burner in fluid communication with the cycle air to provide heated working gas to a second outlet of the thermal reactor, and     a first turbine connected to and driving the compressor, the first compressor connected to the second outlet of the thermal reactor,     a second turbine having an input fluidly coupled to an outlet of the first turbine, and     a two-stroke uniflow scavenge piston unit having         an air intake in fluid communication with the first outlet of the thermal reactor,         a crankshaft mechanically coupled to the second turbine, a camshaft operatively coupled to the crankshaft and rotating in synchronization with the crankshaft;

a plurality of piston and cylinder units operatively connected to the crankshaft, each of the piston and cylinder units having         a piston mounted for sliding motion within a respective cylinder and operatively connected to the crankshaft,         a hollow cylindrical exhaust valve mounted concentrically with the piston at one end of the respective cylinder the exhaust valve being mounted for sliding motion with respect to an inner surface of a respective piston and cylinder unit, and the exhaust valve being in fluid communication with a second inlet of the thermal reactor,     a double acting exhaust valve actuator responsive to rotation of the camshaft and operatively coupled to an annular body of the hollow cylindrical exhaust valve, the exhaust valve actuator, the method comprising:

directing cycle air from the compressor to the thermal reactor;

injecting fuel into the thermal reactor;

igniting and burning the fuel in the thermal reactor, thereby rotating the first turbine, the second turbine and the crankshaft to reciprocate pistons within the plurality of piston and cylinder units;

moving the hollow cylindrical exhaust valve to an open position in response to a first force derived directly from the rotation of the camshaft and applied to the annular body of the exhaust valve in a direction substantially away from the crankshaft; and         moving the hollow cylindrical exhaust valve to a closed position in response to a second force derived directly from the rotation of the camshaft and applied to the annular body of the exhaust valve in a direction substantially toward the crankshaft.

\* \* \* \* \*